United States Patent
Hoshino

(10) Patent No.: US 10,923,870 B2
(45) Date of Patent: Feb. 16, 2021

(54) CARE UNIT

(71) Applicant: PANASONIC INTELLECTUAL PROPERTY MANAGEMENT CO., LTD., Osaka (JP)

(72) Inventor: Junichi Hoshino, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/737,736

(22) Filed: Jan. 8, 2020

(65) Prior Publication Data

US 2020/0244023 A1     Jul. 30, 2020

(30) Foreign Application Priority Data

Jan. 30, 2019 (JP) .............................. JP2019-014582

(51) Int. Cl.
*H01R 13/64* (2006.01)
*H01R 33/06* (2006.01)
(Continued)

(52) U.S. Cl.
CPC ............. *H01R 33/06* (2013.01); *H01R 13/26* (2013.01); *H01R 13/405* (2013.01);
(Continued)

(58) Field of Classification Search
CPC .... H01R 13/26; H01R 13/405; H01R 13/631; H01R 33/06; H02J 7/0045; H02J 7/0044;
(Continued)

(56) References Cited

U.S. PATENT DOCUMENTS 2,101,345 A * 12/1937 Hunter ................... H01R 13/26
                                                   439/333
4,622,507 A * 11/1986 Persen .................. H01M 10/46
                                                   320/111
(Continued)

FOREIGN PATENT DOCUMENTS

JP        60-213229 A     10/1985
JP        2009-268818 A   11/2009

OTHER PUBLICATIONS

The Extended European Search Report dated Jun. 26, 2020 for the related European Patent Application No. 20152211.7.

*Primary Examiner* — Abdullah A Riyami
*Assistant Examiner* — Vladimir Imas
(74) *Attorney, Agent, or Firm* — McDermott Will and Emery LLP

(57) ABSTRACT

The care unit according the present disclosure includes a care apparatus that includes a storage battery and a charging stand that is electrically connected to the care apparatus, and the care unit includes a first terminal, a second terminal, a third terminal, a fourth terminal, a first cover, a second cover, a third cover, and a fourth cover. When the care apparatus is held in a predetermined position of the charging stand, the third cover is not in contact with the first cover in a radial direction orthogonal to an insertion direction of the first cover, and the fourth cover is not in contact with the second cover in a radial direction orthogonal to an insertion direction of the second cover.

6 Claims, 5 Drawing Sheets

(51) Int. Cl.
*H01R 13/26* (2006.01)
*H01R 13/405* (2006.01)
*H01R 13/631* (2006.01)
*H02J 7/00* (2006.01)
*A61C 17/02* (2006.01)
*A61C 17/22* (2006.01)

(52) U.S. Cl.
CPC .......... *H01R 13/631* (2013.01); *H02J 7/0045* (2013.01); *A61C 17/0202* (2013.01); *A61C 17/22* (2013.01); *A61C 2204/002* (2013.01)

(58) Field of Classification Search
CPC ................ A61C 17/0202; A61C 17/22; A61C 2204/002; A61C 17/16
USPC ......................................................... 439/374
See application file for complete search history.

(56) References Cited

U.S. PATENT DOCUMENTS

| | | | | |
|---|---|---|---|---|
| 4,818,231 A * | 4/1989 | Steiner | ................. | A61C 19/004 433/215 |
| 5,479,486 A * | 12/1995 | Saji | ...................... | H02J 7/0045 455/573 |
| 5,634,791 A * | 6/1997 | Matsuura | ............. | A61C 17/024 433/87 |
| 6,821,119 B2 * | 11/2004 | Shortt | ................... | A61C 17/22 433/118 |
| 6,845,537 B2 * | 1/2005 | Wong | .................... | A61C 17/22 15/21.1 |
| 8,863,416 B2 * | 10/2014 | Leung | ................... | A47G 33/06 40/442 |
| 9,089,390 B2 * | 7/2015 | Klemm | ................. | A61C 17/22 |
| 9,839,491 B2 * | 12/2017 | Nichols | ................. | A61C 1/088 |
| 9,891,680 B2 * | 2/2018 | Hijazi | ....................... | G06F 1/26 |
| 9,907,634 B2 * | 3/2018 | Kleppen | ............. | A61C 17/3418 |
| 9,987,109 B2 * | 6/2018 | Sokol | .................... | A61C 17/36 |
| 10,022,203 B2 * | 7/2018 | Simon | ....................... | A61C 5/42 |
| 10,136,976 B2 * | 11/2018 | Miyamichi | ........ | A61C 17/3481 |
| 10,265,147 B2 * | 4/2019 | Fugger | ................ | A61C 17/224 |
| 10,321,976 B2 * | 6/2019 | Reyes | ................... | A61C 1/088 |
| 10,389,057 B2 * | 8/2019 | Maeda | .............. | H01R 13/4538 |
| 10,431,944 B1 * | 10/2019 | Su | ....................... | H01R 13/5202 |
| 10,433,940 B2 * | 10/2019 | Wu | ....................... | A61C 17/225 |
| 10,512,528 B2 * | 12/2019 | Tsutsui | ................... | H02J 50/12 |
| 10,610,008 B2 * | 4/2020 | Wagner | ............... | A61C 17/225 |
| 10,624,725 B2 * | 4/2020 | King | ...................... | A61C 17/032 |
| 10,629,870 B1 * | 4/2020 | Huang | ................. | H05K 3/301 |
| 10,666,001 B2 * | 5/2020 | Hou | ................... | H01R 13/193 |
| 10,714,953 B1 * | 7/2020 | Solana | .................. | H02J 50/005 |
| 10,734,746 B2 * | 8/2020 | Ogasawara | ........ | H01R 13/2407 |
| 2012/0147595 A1 * | 6/2012 | Wang | ...................... | F21L 4/08 362/183 |
| 2015/0180160 A1 * | 6/2015 | Chen | .................. | H01R 13/5213 320/115 |

* cited by examiner

CARE UNIT

CROSS-REFERENCE OF RELATED APPLICATIONS

This application claims the benefit of Japanese Application No. 2019-014582, filed on Jan. 30, 2019, the entire disclosure of which Application is incorporated by reference herein.

BACKGROUND

1. Technical Field

The present disclosure relates to a care apparatus that cares for a human body or an animal such as an oral washer, a shaver, hair clippers, and a facial equipment, and a care unit in which a care apparatus is combined with a charging stand electrically connected to the care apparatus.

2. Description of the Related Art

As an example of a care unit, an electric toothbrush, which is one of oral hygiene instruments, and a charging stand of the electric toothbrush are disclosed in Unexamined Japanese Patent Publication No. 2009-268818. The care unit described in Unexamined Japanese Patent Publication No. 2009-268818 transmits power to the electric toothbrush by contactless power transmission through placement of the electric toothbrush on the charging stand. In this way, a storage battery incorporated in the electric toothbrush is charged.

SUMMARY

In a case where a capacity of the storage battery included in the care apparatus is increased, a charging efficiency is low in contactless power transmission, and therefore a long time is required to fully charge the storage battery. On the other hand, when a connector including a contact-type terminal is used, the charging efficiency can be improved. However, a care apparatus such as an oral washer, an electric toothbrush, and an electric razor may be used in an area where water is used, a configuration in which the terminal hardly come into contact with water is required. Taking the above point into consideration, a configuration is desirable in which the care apparatus can be easily attached to or detached from the charging stand.

An object of the present disclosure is to provide a care unit in which convenience during charging is improved.

In order to achieve the object described above, the care unit according to the present disclosure is a care unit that includes a care apparatus that includes a storage battery and a charging stand that is electrically connected to the care apparatus, the care unit including: a first terminal; a second terminal; a third terminal that is detachably connected to the first terminal; a fourth terminal that is detachably connected to the second terminal; a first cover having a cylindrical shape, the first cover including a first opening that allows insertion of the third terminal, and storing at least a part of the first terminal; a second cover having a cylindrical shape, the second cover including a second opening that allows insertion of the fourth terminal, and storing at least a part of the second terminal; a third cover having a cylindrical shape, the third cover including a third opening that allows insertion of the first cover, and storing at least a part of the third terminal; and a fourth cover having a cylindrical shape, the fourth cover including a fourth opening that allows insertion of the second cover, and storing at least a part of the fourth terminal, in which when the care apparatus is held in a predetermined position of the charging stand, the third cover is not in contact with the first cover in a radial direction orthogonal to an insertion direction of the first cover, and the fourth cover is not in contact with the second cover in a radial direction orthogonal to an insertion direction of the second cover.

According to the care unit of the present disclosure, convenience during charging is improved.

DETAILED DESCRIPTION

Hereinafter, a care unit according to an exemplary embodiment of the present disclosure will be described in detail with reference to the drawings. The exemplary embodiment described below is a preferred specific example of the present disclosure. Therefore, numeric values, shapes, materials, constituents, dispositions and connection modes of the constituents, and the like, which are shown in the following exemplary embodiment, are merely examples, and are not intended to limit the present disclosure. Accordingly, among the constituents in the following exemplary embodiment, constituents which are not recited in the independent claim for the most generic concept of the present disclosure are described as arbitrary constituents.

The drawings are also schematic views, and are not always exactly illustrated. In the respective drawings, identical components are denoted by identical reference symbols.

Figure 1:
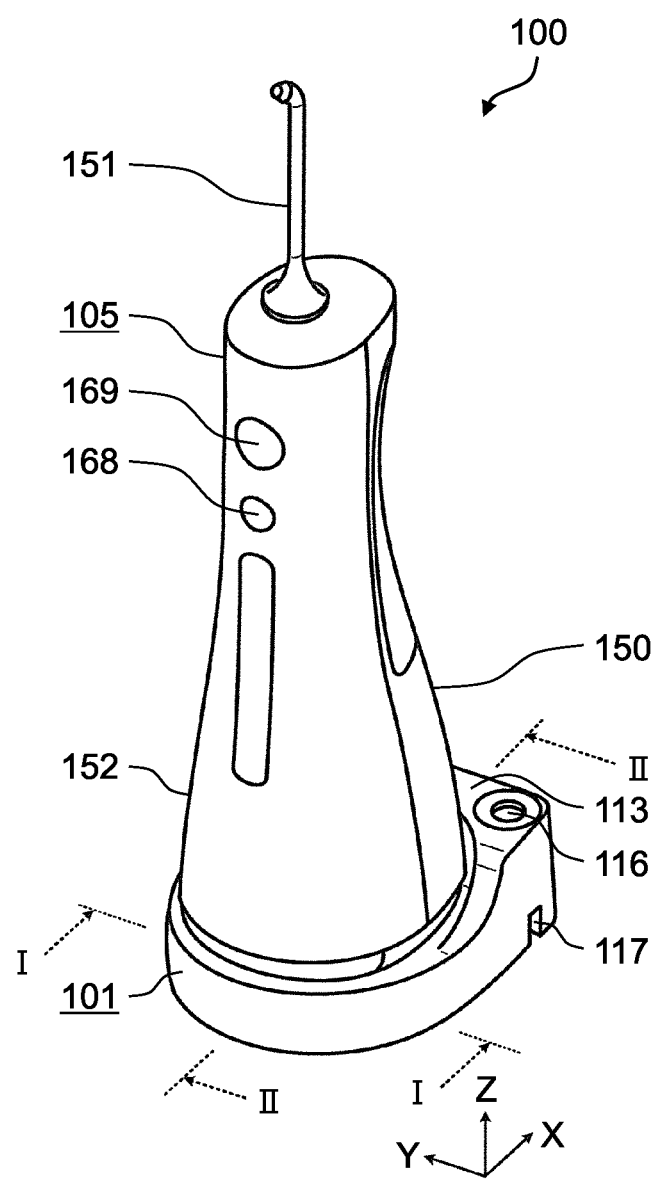
FIG. 1 is a perspective view showing a care unit according to an exemplary embodiment.

FIG. 1 is a perspective view showing a care unit according to an exemplary embodiment. As shown in FIG. 1, care unit 100 includes charging stand 101 and care apparatus 105.

Figure 2:
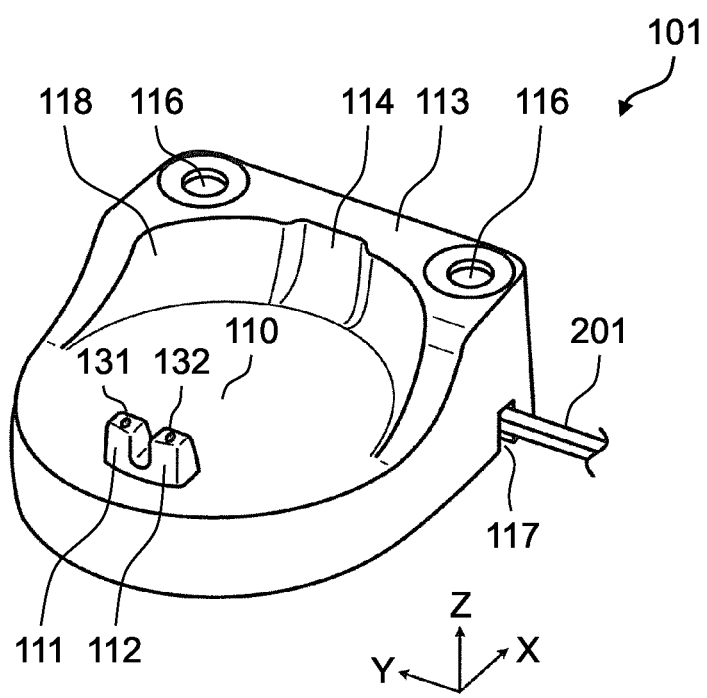
FIG. 2 is a perspective view showing a charging stand according the exemplary embodiment.

FIG. 2 is a perspective view showing a charging stand according the exemplary embodiment. As shown in FIG. 1, charging stand 101 is an apparatus that holds care apparatus 105 so as to be electrically connected to care apparatus 105 and supply power to a storage battery included in care apparatus 105. In a case of the present exemplary embodiment, charging stand 101 is a member that includes a function that relays power supplied by power supply cable 201 and holds care apparatus 105 that is placed on top of placing surface 110. Charging stand 101 includes first cover 111, second cover 112, guide 113, and rotation regulating portion 114. Moreover, charging stand 101 includes nozzle holder 116 that holds nozzle 151 to be attached to care apparatus 105 in two places, and cable opening 117, through which power supply cable 201 is passed.

First cover 111 is a portion having a cylindrical shape that includes first opening 131, into which third terminal 163 (described later) that is a connection terminal is inserted, and stores first terminal 121 (described later) that is electrically connected to third terminal 163. Second cover 112 is a portion having a cylindrical shape that includes second opening 132, into which fourth terminal 164 (described later) that is a connection terminal is inserted, and stores at least a part of second terminal 122. Note that details of first cover 111 and second cover 112, and first terminal 121 and second terminal 122 not shown in FIGS. 1 and 2 will be described later.

Guide 113 is a portion for holding care apparatus 105 in a predetermined position of charging stand 101. A specific shape of guide 113 is not particularly limited. A three-dimensional shape, a two-dimensional pattern, or the like may be applied as long as the shape guides the position of care apparatus 105 with respect to charging stand 101 when care apparatus 105 is held on charging stand 101. In the case of the present exemplary embodiment, guide 113 is a portion protruding from placing surface 110 of charging stand 101 in an erected manner, and includes wall surface 118 that is curved along a part of a shape of a peripheral bottom of care apparatus 105.

Rotation regulating portion 114 is a portion that regulates displacement of care apparatus 105 with respect to charging stand 101 in a rotation direction when care apparatus 105 is going to be attached or has been attached to charging stand 101. Here, the rotation direction of care apparatus 105 with respect to charging stand 101 is a direction whose axis of rotation is a direction of attaching care apparatus 105 to charging stand 101 (Z-axis direction in the drawing). In the case of the present exemplary embodiment, rotation regulating portion 114 is a portion having a groove shape that extends in the Z-axis direction in the drawing and is recessed from wall surface 118 in an X-axis direction orthogonal to the Z-axis direction, and a portion into which a rotation regulated portion (not shown) is fitted, the rotation regulated portion provided at the bottom of care unit 100 and protruding in a radial direction.

Note that a material or a manufacturing method of charging stand 101 is not particularly limited. In the case of the present exemplary embodiment, charging stand 101 is a resin mold formed so as to have a predetermined thickness.

According to charging stand 101 described above, when care apparatus 105 is placed on charging stand 101, the rotation regulated portion of care apparatus 105 is fitted into rotation regulating portion 114, and care apparatus 105 is placed on placing surface 110 while the bottom of care apparatus 105 is disposed along wall surface 118. In the manner described above, third cover 153 and fourth cover 154 (see FIG. 4) provided at the bottom of care apparatus 105 can be easily inserted into first cover 111 and second cover 112, respectively. Moreover, the position of care apparatus 105 on placing surface 110 is determined while care apparatus 105 is placed on placing surface 110. Therefore, positional relationships of first cover 111 and second cover 112 with respect to third cover 153 and fourth cover 154, respectively, are determined.

Figure 3:
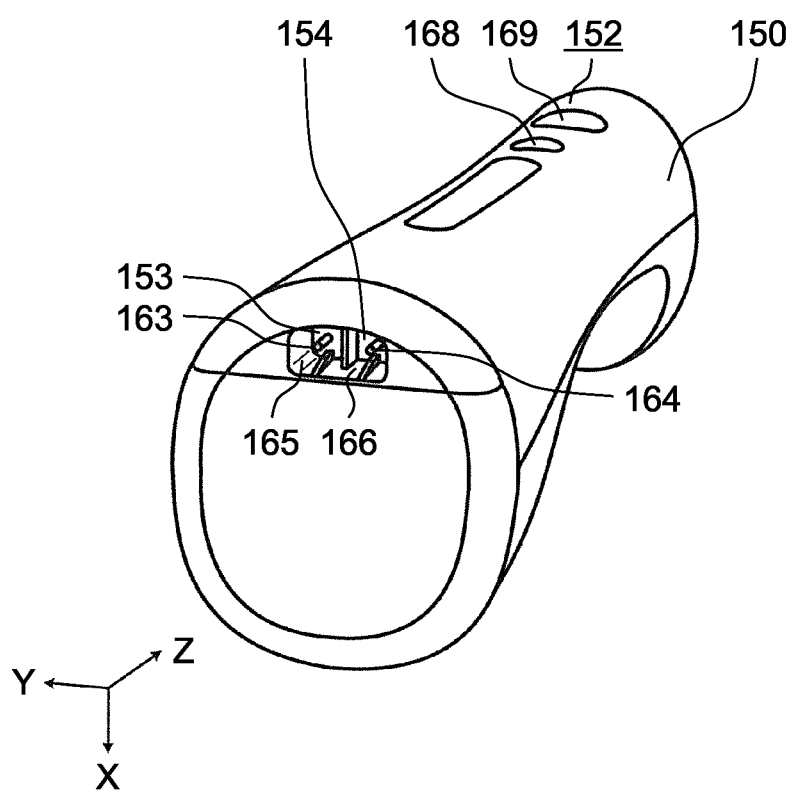
FIG. 3 is a perspective view showing a care apparatus according to the exemplary embodiment, as viewed from a bottom.
Figure 4:
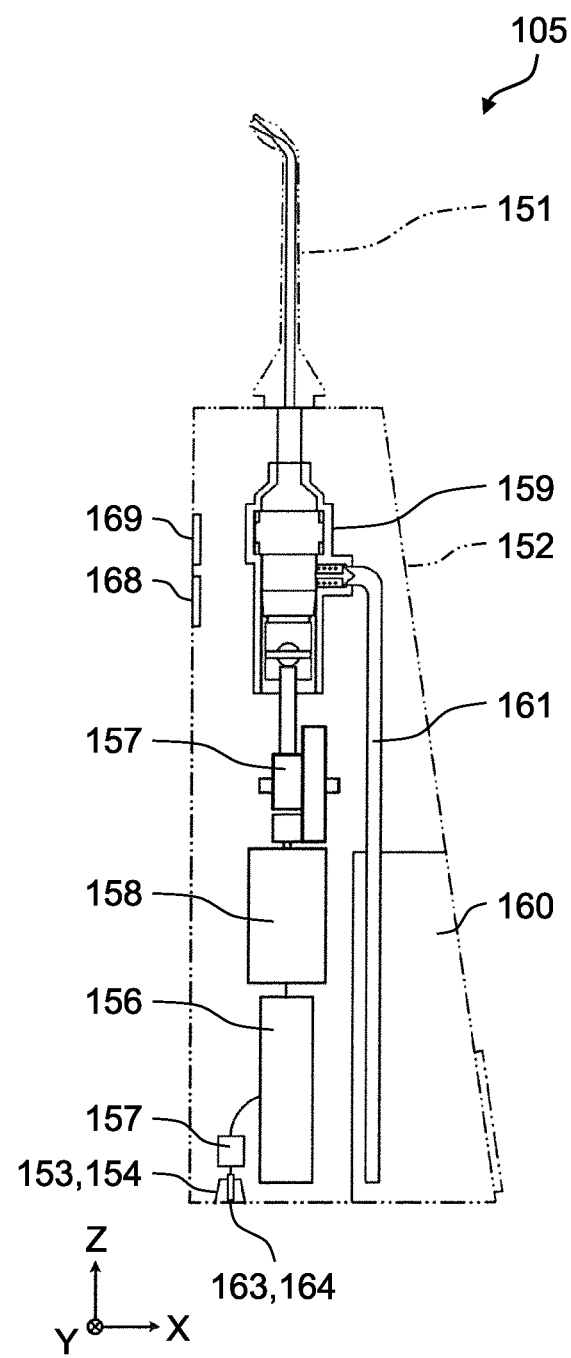
FIG. 4 is a view schematically showing an inner structure of the care apparatus according to the exemplary embodiment, as viewed from a side.

FIG. 3 is a perspective view showing a care apparatus according to the exemplary embodiment from a bottom. FIG. 4 is a view schematically showing an inner structure of the care apparatus according to the exemplary embodiment from a side.

Care apparatus 105 is an apparatus that cares for an inside of a month or hair of a person or an animal by power of a storage battery. In the case of the present exemplary embodiment, an oral washer is exemplified as care apparatus 105. As shown in FIG. 1, care apparatus 105 is a compact apparatus that can be held with one hand of a person, and includes nozzle 151 (see FIG. 4) and apparatus body 152 (see FIG. 4).

Nozzle 151 is a member that includes a discharge port that discharges a liquid between teeth, and is detachably attached to an upper end of apparatus body 152. Nozzle 151 forms a passage through which a liquid such as water whose pressure has been increased by apparatus body 152 is discharged in a predetermined direction. The passage of the liquid formed by nozzle 151 has a venturi structure, and decreases the pressure to a saturated steam pressure by increasing a flow velocity of the liquid. Accordingly, a part of the liquid is changed into a gas, and thus bubbles are generated in the liquid. In addition, the passage changes the babbles into a liquid by gradually recovering the pressure of the liquid so that the pressure of the liquid is restored to be equal to or more than the saturated steam pressure. At this time, the bubbles burst and thus high shock waves are momentarily generated. These shock waves can be used for removal of a dirt inside the mouth, particularly a dirt between teeth.

Apparatus body 152 is an apparatus that discharges a liquid through nozzle 151, and includes apparatus housing 150 having a substantially cylindrical shape when viewed as a whole that can be easily held with one hand of a person. Since apparatus housing 150 is caught in an edge of a palm of a hand that holds apparatus housing 150, a burden on an arm due to a weight of care apparatus 105 can be reduced. Apparatus body 152 includes third cover 153, fourth cover 154 (see FIG. 3), third terminal 163, and fourth terminal 164 at the bottom of apparatus housing 150. In addition, as shown in FIG. 4, apparatus body 152 includes storage battery 156, power storage controller 157, driving source 158, pressure raising discharge mechanism 159, tank 160, and tube 161 inside. Note that third cover 153, fourth cover 154, third terminal 163, and fourth terminal 164 will be described later together with first cover 111, second cover 112, first terminal 121, and second terminal 122.

Storage battery 156 is a secondary battery that can store power by being supplied with power and can supply the stored power to driving source 158 and the like. A type of storage battery 156 is not particularly limited. A lithium ion battery and the like can be exemplified.

Power storage controller 157 is a circuit that monitors a power storage amount of storage battery 156 and can block a supply of power to storage battery 156 when storage battery 156 is fully charged. Note that power storage controller 157 does not have to be included in care apparatus 105.

Driving source 158 is an apparatus that generates driving force for driving pressure raising discharge mechanism 159. Driving source 158 is not particularly limited. An electric motor and the like can be exemplified.

Pressure raising discharge mechanism 159 is a mechanism that lifts a liquid in tank 160 through tube 161, increases the pressure of the lifted liquid to a predetermined pressure, and then discharges the liquid. Pressure raising discharge mechanism 159 is not particularly limited. A mechanism can be exemplified that lifts a liquid, increases a pressure, and discharges the liquid through using of a piston that is caused to reciprocate by driving source 158 and a combination of a plurality of valves.

In addition, a front of apparatus body 152 is provided with power button 169 and adjustment button 168 for adjusting the pressure of the liquid discharged from nozzle 151. Power button 169, adjustment button 168 and the like are electrically connected to a controller that is not shown. The controller is, for example, a microcomputer and is incorporated in apparatus body 152.

A user who holds apparatus body 152 with nozzle 151 attached disposes a tip end of nozzle 151 near an area between teeth and operates power button 169 so as to discharge the liquid to the area between the teeth and care for the inside of the mouth.

Figure 5:
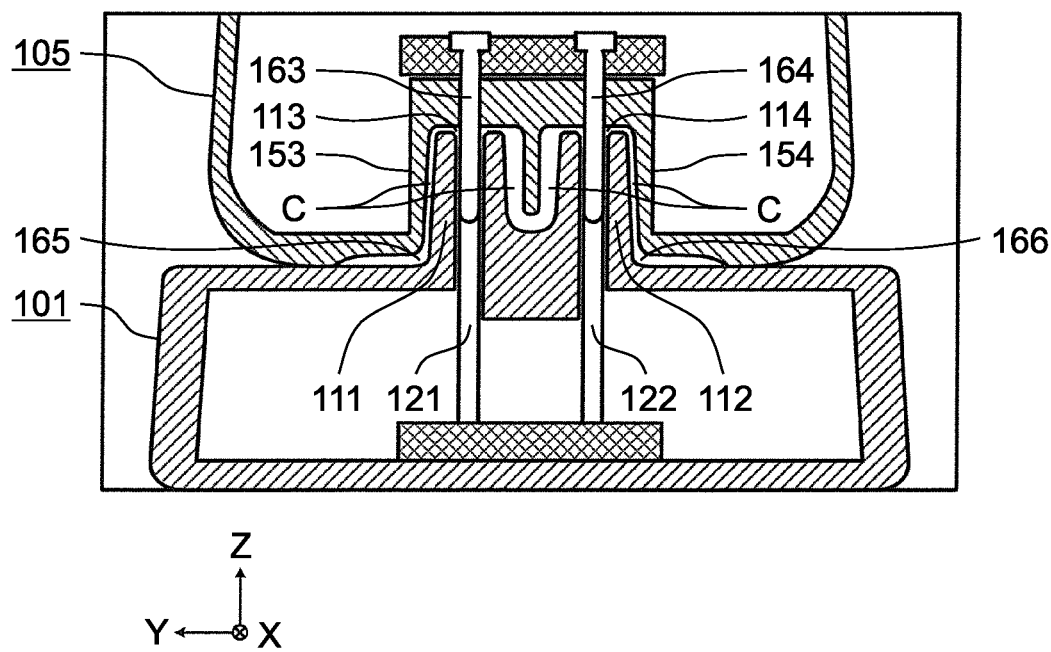
FIG. 5 is a sectional view taken along line I-I in FIG. 1 showing a terminal portion of the care unit when the care apparatus is attached to the charging stand.
Figure 6:
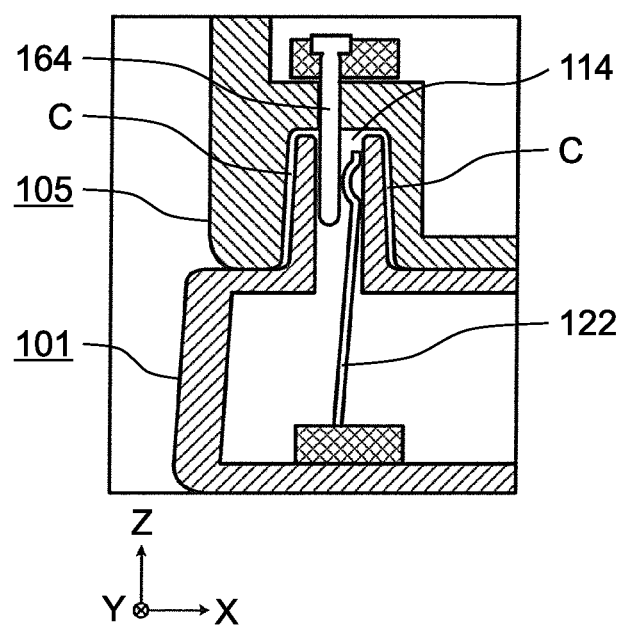
FIG. 6 is a sectional view taken along line II-II in FIG. 1 showing the terminal portion of the care unit when the care apparatus is attached to the charging stand.

FIG. 5 is a sectional view taken along line I-I in FIG. 1 showing a terminal portion of the care unit when the care apparatus is attached to the charging stand. FIG. 6 is a sectional view taken along line II-II in FIG. 1 showing the terminal portion of the care unit when the care apparatus is attached to the charging stand. In the case of the present exemplary embodiment, charging stand 101 includes first terminal 121, second terminal 122, first cover 111, and second cover 112. Care apparatus 105 includes third terminal 163, fourth terminal 164, third cover 153, and fourth cover 154.

First terminal 121 and second terminal 122 are connection terminals that are electrically connected to third terminal 163 and fourth terminal 164, respectively, and supply power transmitted through power supply cable 201 to care apparatus 105. In the case of the present exemplary embodiment, the power supplied through power supply cable 201 is a direct-current voltage suitable to charge storage battery 156, and first terminal 121 and second terminal 122 each are electrically connected to power supply cable 201.

First terminal 121 is electrically connected to third terminal 163 with a unidirectional biasing force only, and second terminal 122 is electrically connected to fourth terminal 164 with a unidirectional biasing force only. A generation source of the biasing force is not particularly limited. For example, a biasing member such as a rubber or a spring that biases first terminal 121 and second terminal 122 separately or integrally may be included. In the case of the present exemplary embodiment, first terminal 121 and second terminal 122 are formed of a material having an elastic force such as spring steel, and the elastic forces of first terminal 121 and second terminal 122 enable first terminal 121 and second terminal 122 to connect to third terminal 163 and fourth terminal 164, respectively.

In the case of the present exemplary embodiment, an axis of a biasing direction of first terminal 121 is parallel to an axis of a biasing direction of second terminal 122. Specifically, the axis of the biasing direction of first terminal 121 and the axis of the biasing direction of second terminal 122 are parallel to an axis of a direction extending from an end of charging stand 101 where guide 113 is provided toward an end of an opposite side (X-axis in the drawing). In addition, the biasing direction of first terminal 121 extends from the end where guide 113 is provided toward the end of the opposite side (negative direction of the X-axis in the drawing). The biasing direction of second terminal 122 is a same direction as the biasing direction of first terminal 121.

A shape of first terminal 121 and a shape of second terminal 122 are identical, and same parts can be used for first terminal 121 and second terminal 122.

First cover 111 is a portion having a cylindrical shape that includes first opening 131, into which third terminal 163 is inserted, and stores first terminal 121. Second cover 112 is a portion having a cylindrical shape that includes second opening 132, into which fourth terminal 164 is inserted, and stores second terminal 122.

In the case of the present exemplary embodiment, first cover 111 and second cover 112 each are a portion that protrudes from placing surface 110 toward a side of care apparatus 105 that is held. First cover 111 and second cover 112 are disposed side by side in a direction orthogonal to the biasing direction of first terminal 121 and second terminal 122. An outer shape of first cover 111 and an outer shape of second cover 112 each are a quadrangular pyramid that tapers from placing surface 110 toward a protruding direction (positive direction of the Z-axis direction in the drawing). Vicinities of first cover 111 and second cover 112 on placing surfaces 110 are connected to each other.

In the case of the present exemplary embodiment, the shape of each of first opening 131 and second opening 132 provided on a top surface of first cover 111 and a top surface of second cover 112, respectively, is not a perfect circle. Two adjacent sides of each of a bounding rectangle of first opening 131 and a bounding rectangle of second opening 132 are different in length. Here, a bounding rectangle refers to a smallest rectangle that can surround a contour. Specifically, the shape of each of first opening 131 and second opening 132 is an oval shape including an oblong shape and an elliptical shape. First opening 131 and second opening 132 are disposed so that longitudinal directions of first opening 131 and second opening 132 are parallel to the biasing directions of first terminal 121 and second terminal 122, respectively.

While care apparatus 105 is held in the predetermined position of charging stand 101, sizes of first opening 131 and second opening 132 are set so that there is a gap between third terminal 163 and fourth terminal 164 that have been inserted. Note that in a case where the position in which care apparatus 105 is held with respect to charging stand 101 is displaced from the predetermined position, at least one of a pair of first opening 131 and third terminal 163, and a pair of second opening 132 and fourth terminal 164 may come into contact with each other.

Third terminal 163 is a connection terminal that is detachably and electrically connected to first terminal 121. Fourth terminal 164 is a connection terminal that is detachably and electrically connected to second terminal 122. In the case of the present exemplary embodiment, third terminal 163 and fourth terminal 164 are connected to storage battery 156 through power storage controller 157, and supply power relayed by charging stand 101 to storage battery 156.

Third terminal 163 and fourth terminal 164 each are a rod-shaped member having rigidity that can maintain the shape against the biasing force of each of first terminal 121 and second terminal 122. In the case of the present exemplary embodiment, third terminal 163 and fourth terminal 164 each are a round rod.

Third cover 153 is a portion having a cylindrical shape that includes third opening 165, into which first cover 111 is inserted, and stores at least a part of third terminal 163. Fourth cover 154 is a portion having a cylindrical shape that includes fourth opening 166, into which second cover 112 is inserted, and stores at least a part of fourth terminal 164.

In the case of the present exemplary embodiment, third cover 153 and fourth cover 154 each are a portion recessed inward from the bottom of care apparatus 105. Third cover 153 and fourth cover 154 are disposed side by side in the direction orthogonal to the biasing directions of first terminal 121 and second terminal 122. An inner shape of third cover 153 and an inner shape of fourth cover 154 correspond to the outer shape of first cover 111 and the outer shape of second cover 112, respectively, and each are a quadrangular pyramid that tapers inward from the bottom (positive direction of the Z-axis direction in the drawing). Wall surfaces of third cover 153 and fourth cover 154 are partially shared, and a shared wall surface 118 separates third terminal 163 from fourth terminal 164.

In the case of the present exemplary embodiment, third terminal 163 and fourth terminal 164 are attached to ceiling surfaces of third cover 153 and fourth cover 154, respectively, in a protruded manner.

While care apparatus 105 is held in the predetermined position of charging stand 101, the sizes of the outer shape of first cover 111, the outer shape of second cover 112, the inner shape of third cover 153, and the inner shape of fourth cover 154 are set so that, in a radial direction orthogonal to an insertion direction of first cover 111, an entire periphery of third cover 153 is not in contact with an entire periphery of first cover 111, and in a radial direction orthogonal to an insertion direction of second cover 112, an entire periphery of fourth cover 154 is not in contact with an entire periphery of second cover 112. That is, while care apparatus 105 is held in the predetermined position of charging stand 101, gap C exists between first cover 111 and third cover 153, and between second cover 112 and fourth cover 154 (see FIGS. 5 and 6).

Note that in the case where the position in which care apparatus 105 is held with respect to charging stand 101 is displaced from the predetermined position, at least one of a pair of first cover 111 and third cover 153, and a pair of second cover 112 and fourth cover 154 may come into contact with each other.

According to the configuration described above, when care apparatus 105 is attached to or detached from charging stand 101, in particular, when care apparatus 105 is removed from charging stand 101, first cover 111 and third cover 153, and second cover 112 and fourth cover 154 do not rub against each other. Therefore, even if charging stand 101 is placed on a washstand or the like without being fixed, care apparatus 105 can be removed from charging stand 101 without holding down of charging stand 101 with a hand or the like. As a result, care apparatus 105 can be easily removed from charging stand 101 while being held by a hand, and care apparatus 105 can be easily used. In addition, after a use of care apparatus 105, care apparatus 105 can be easily attached to charging stand 101 to start charging of care apparatus 105.

In addition, since first terminal 121 and second terminal 122 are covered and protected by first cover 111 and second cover 112, respectively, for example, first terminal 121 and second terminal 122 can be prevented from being in contact with a liquid such as dripped water from care apparatus 105 to charging stand 101. In addition, since gap C is provided between first cover 111 and third cover 153, and second cover 112 and fourth cover 154, both water repellence and easiness of attachment and detachment can be achieved. In addition, first cover 111 and second cover 112 provided on placing surface 110 of charging stand 101 serve as marks that show a position when care apparatus 105 is disposed on charging stand 101, and an engagement of recesses and projections contributes to prevention of displacement after disposition.

Note that the present disclosure is not limited to the exemplary embodiment described above. For example, a different exemplary embodiment implemented by arbitrarily combining constituents described herein or excluding some of the constituents may be adopted as the exemplary embodiment of the present disclosure. In addition, the present disclosure includes modifications obtained by adopting various modifications which are conceivable by those skilled in the art for the exemplary embodiment described above within the scope not departing from the gist of the present disclosure, that is, the meaning of the description in the scope of the claims.

For example, charging stand 101 not only relays power, but may include a circuit such as a voltage lowering circuit and a direct current conversion circuit.

The case where first terminal 121 and second terminal 122 are provided in charging stand 101 and third terminal 163 and fourth terminal 164 are provided in care apparatus 105 has been described. Alternatively, first terminal 121 and fourth terminal 164 may be included in charging stand 101, and second terminal 122 and third terminal 163 may be included in care apparatus 105.

Alternatively, at least one of first terminal 121 and third terminal 163 may be biased, and at least one of second terminal 122 and fourth terminal 164 may be biased.

Alternatively, the shape of each of first cover 111, second cover 112, third cover 153, and fourth cover 154 is not limited to a quadrangular pyramid, and an arbitrary shape such as a truncated cone can be applied.

Alternatively, the top surface of first cover 111 and the ceiling surface of third cover 153, and the top surface of second cover 112 and the ceiling surface of fourth cover 154 may come into contact with each other.

The present disclosure can be applied to a compact care apparatus including a storage battery.

What is claimed is:

1. A care unit that includes a care apparatus and a charging stand, the care apparatus including a storage battery, the charging stand being electrically connected to the care apparatus, the care unit comprising:
    a first terminal;
    a second terminal;
    a third terminal that is detachably connected to the first terminal;
    a fourth terminal that is detachably connected to the second terminal;
    a first cover having a cylindrical shape, the first cover including a first opening that allows insertion of the third terminal, and storing at least a part of the first terminal;
    a second cover having a cylindrical shape, the second cover including a second opening that allows insertion of the fourth terminal, and storing at least a part of the second terminal;
    a third cover having a cylindrical shape, the third cover including a third opening that allows insertion of the first cover, and storing at least a part of the third terminal; and
    a fourth cover having a cylindrical shape, the fourth cover including a fourth opening that allows insertion of the second cover, and storing at least a part of the fourth terminal,
    wherein when the care apparatus is held in a predetermined position of the charging stand, the third cover is not in contact with the first cover in a radial direction orthogonal to an insertion direction of the first cover, and the fourth cover is not in contact with the second cover in a radial direction orthogonal to an insertion direction of the second cover.

2. The care unit according to claim 1, wherein
    the first terminal is connected to the third terminal with a unidirectional biasing force only, and the second terminal is connected to the fourth terminal with a unidirectional biasing force only.

3. The care unit according to claim 2 wherein an axis of a biasing direction of the first terminal is parallel to an axis of a biasing direction of the second terminal.

4. The care unit according to claim 1, wherein two adjacent sides of each of a bounding rectangle of the first opening and a bounding rectangle of the second opening are different in length.

5. The care unit according to claim 1, wherein the charging stand includes a guide that holds the care apparatus in a predetermined position.

6. The care unit according to claim 5, wherein the guide includes a rotation regulating portion that regulates displacement of the care apparatus with respect to the charging stand in a rotation direction.

* * * * *